United States Patent [19]

Iwamura

[11] 4,298,246

[45] Nov. 3, 1981

[54] REFLECTION TYPE SCREEN

[75] Inventor: Seishiro Iwamura, Nagaokakyo, Japan

[73] Assignee: Mitsubishi Denki Kabushiki Kaisha, Tokyo, Japan

[21] Appl. No.: 92,032

[22] Filed: Nov. 7, 1979

[30] Foreign Application Priority Data

Nov. 8, 1978 [JP] Japan ................................. 53-137696

[51] Int. Cl.³ ............................................. G03B 21/56
[52] U.S. Cl. .................................. 350/122; 350/128; 350/129
[58] Field of Search ............... 350/117, 128, 127, 129, 350/125; 354/115; 355/122

[56] References Cited

U.S. PATENT DOCUMENTS

| | | | |
|---|---|---|---|
| 1,942,841 | 1/1934 | Shimizu | 350/128 |
| 2,991,693 | 7/1961 | MacNeille | 350/128 |
| 3,191,495 | 6/1965 | Miller | 350/128 |
| 3,408,132 | 10/1968 | Chandler et al. | 350/125 |

*Primary Examiner*—Richard A. Wintercorn
*Attorney, Agent, or Firm*—Oblon, Fisher, Spivak, McClelland & Maier

[57] ABSTRACT

A reflection type screen is made of a transparent substrate which has many convex lenses on the front surface and many mirror planes and black planes on the rear surface. Each lens has a focal length so as to form a focus behind the rear surface as a reflective plane. A part of incident rays is reflected on the mirror planes and the other part of the incident rays is absorbed into the black planes.

6 Claims, 2 Drawing Figures

REFLECTION TYPE SCREEN

BACKGROUND OF THE INVENTION

1. Field of the Invention

The present invention relates to an improved reflection type screen which effectively collect energy of rays in the range of the observation so as to increase brightness of the picture under preventing reflection of needless incident rays beside the incident rays projected from the projector, in the observation of the pictures resulted by the reflected rays of images such as moving pictures which are optically formed on the screen by a projector.

2. Description of the Prior Art

The conventional screens mostly have the characteristic shown in FIG. 1 wherein incident rays (4) projected from a projector (1) form images on a screen (2) as image formation and the diffused reflection is resulted from the formed images and many observers (3) observe the reflected rays (5).

In such observation, the images of the pictures resulted by the reflected rays (5) are highly deformed so as to be unsatisfactory. Moreover, the reflected rays are radiated along the directions parallel to the screen so as to cause a loss of energy of the rays. When needless rays (6) are passed from the other directions beside the direction of the projector (1), the reflected rays (7) are passed into the observers eyes (3) so as to give inferior contrast of the pictures.

In order to overcome the disadvantages, it has been required to make dark in the room for the observation.

SUMMARY OF THE INVENTION

It is an object of the present invention to overcome said disadvantages and to provide a reflection type screen which effectively reflects rays in a range of the observation and which absorbs needless incident rays passed from the other direction beside the direction of the projector so as to give superior bright pictures without any inferior contrast.

The foregoing and other objects of the present invention have been attained by providing a reflection type screen which comprises a transparent substrate; many convex lenses which have so small size as to be nondiscriminatable in an observation from an observer's position and have each focal length to give each focus behind the rear surface of the transparent substrate; and said rear surface comprising many mirror planes for internally reflecting rays on parts for forming ray spots in the incidence of a substantially parallel luminous flux into the convex lenses and black planes on the other parts of the rear surface.

DETAILED DESCRIPTION OF THE PREFERRED EMBODIMENTS

Figure 1:
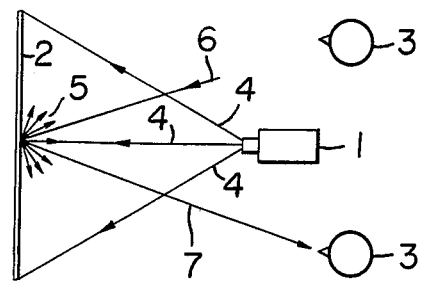
FIG. 1 is a schematic view of an optical system using the conventional screen.
Figure 2:
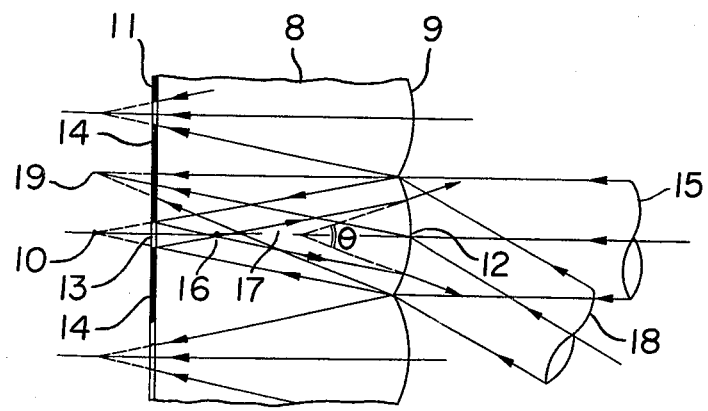
FIG. 2 is a partially enlarged sectional view of one embodiment of a screen of the present invention.

Referring to FIG. 2, one embodiment of the present invention will be illustrated.

FIG. 2 is a partially enlarged sectional view of the screen of the present invention wherein the reference numeral (8) designates a transparent substrate; (9) designates a plane of incidence; (10) designates a focus; (11) designates a plane of reflection; (12) designates a convex lens; (13) designates a mirror plane; (14) designates a black plane; (15) designates a incident rays; (16) designates a symmetry point; (17) designates a point luminant; (18) designates incident rays and (19) designates a pseudofocus.

On the surface of the screen, many convex lenses (12) which have small size so as to be nondiscriminatable in an observation of the plane of incidence (9) on the transparent substrate (8) from an observer's position and have each focal length to give each focus (10) behind the reflective plane (11). The reflective plane (11) has many mirror planes (13) for reflecting rays into the inner parts of the transparent substrate (8), on parts of the incident ray axes and the black plane (14) for absorbing rays on the other parts.

In the use of the screen, image formations of image rays are resulted by projecting from a projector to the plane of incidence (9). The size of each convex lens (12) is enough small in view of the distance of projection, whereby the incident rays pass into the transparent substrate (8) so as to focus at the focuses (10) since the incident rays seem to be parallel luminous flux. However, there are many mirror planes front of the focuses (10) whereby the rays are focused at the points of symmetry (16). The points of symmetry (16) are formed inside in view of the focuses (10) of the convex lenses (12). Therefore, the luminous fluxes pass from the points of symmetry are externally diffused as the reflected rays so as to be the luminous fluxes having each radiation angle $\theta$ from each point luminant.

When the thickness and refractive index of the transparent substrate (8) and the focal length of each convex lens (12) are selected so as to give the radiation angle $\theta$ as the same range of the observation, the rays are effectively reflected in the range of the observation and bright pictures can be observed by the screen having substantially perfect diffused plane.

The incident rays (18) passed from the other directions beside the incident ray axis of the projector, pass into the transparent substrate (8) so as to focus at each pseudofocus (19), however, the rays are absorbed on the black part of the plane of reflection (11) whereby the rays are not reflected from the screen.

When the incident rays (15) passed from the projector do not coincident with the optical axis of each convex lens (12), the positions of the mirror planes (13) are shifted so as to coincide with the incident rays (15) whereby the same result can be attained.

In accordance with the present invention, the screen has the above-mentioned structure, whereby superior bright pictures can be observed without any inferior contrast caused by needless incident rays beside the incident rays projected from the projector. Thus, the observation of the picture can be enjoyed in a bright room.

As one embodiment, a configuration of each lens can be hexagonal quadranglar circular configuration and others. The ratio of vertical height to transversal width of hexagonal or quadranglar configuration is not limited to 1 and preferably greater than 1. A height or width of each lens between both adjacent lenses is preferably in a range of 0.1 to 2.0 mm especially about 1.0 mm. A thickness of the transparent substrate is preferably in a range of 0.1 to 2.0 mm especially about 0.8 mm. A ratio of the black plane to the total plane is preferably in a range of 99 to 10% especially 72 to 63%. A ratio of the mirror plane to the total plane is preferably in a range of 1 to 90% especially 28 to 37%. The focal length can be adjusted by selecting a curvature of each lens.

We claim:

1. A reflection type projection screen, comprising, a transparent substrate having a thickness of 0.1 to 2.0 mm;

a plurality of convex lenses formed on the front surface of said transparent substrate and being of a size so as to be nondiscriminatable from an observers position;

said convex lenses having a focal length which gives a focus behind the rear surface of said transparent substrate and wherein the ratio of vertical height to transversal width of said lenses is greater than one and the vertical height is 0.1 to 2.0 mm;

said rear surface of said transparent substrate having a plurality of mirror areas and a plurality of light absorbing areas where the mirror areas constitute from 28% to 37% of the total area and the light absorbing areas constitute from 72% to 63% of the total area;

wherein light rays arriving from a projector substantially parallel to the optical axis of the said lenses impinge upon the mirror areas, are focused to a point within said substrate and pass back through said lenses to be externally diffused, while light rays arriving at an angle not substantially parallel to the optical axis of said lenses impinge upon the light absorbing areas and are absorbed;

wherein the thickness and refractive index of said transparent substrate and the focal length of said lenses are selected so as to diffuse the reflected rays at the same angle as the range of observation.

2. A reflection type projection screen as defined in claim 1 wherein the thickness of said transparent substrate is 0.8 mm.

3. A reflection type project screen as defined in claim 1 wherein the vertical height of said lens is 1.0 mm.

4. A reflection type projection screen as defined in claim 1 wherein the configuration of the lens is hexagonal.

5. A reflection type projection screen as defined in claim 1 wherein the configuration of the lens is quadrangular.

6. A reflection type projection screen as defined in claim 1 wherein the positions of the mirror areas are shifted when the incident light rays from the projector are not parallel to the optical axis.

* * * * *